H. A. NELON.
FRUIT PARING AND CORING MACHINE.
APPLICATION FILED MAY 28, 1917.

1,263,922.

Patented Apr. 23, 1918.

Inventor
Harry A. Nelon
By Wm. B. Hodges
Attorney

UNITED STATES PATENT OFFICE.

HARRY A. NELON, OF CHARLOTTESVILLE, VIRGINIA.

FRUIT PARING AND CORING MACHINE.

1,263,922.　　　　　Specification of Letters Patent.　　Patented Apr. 23, 1918.

Application filed May 28, 1917. Serial No. 171,362.

*To all whom it may concern:*

Be it known that I, HARRY A. NELON, a citizen of the United States, residing at Charlottesville, in the county of Albemarle and State of Virginia, have invented new and useful Improvements in Fruit Paring and Coring Machines, of which the following is a specification.

This invention is an improved device for coring and dividing apples and similar fruit.

One of the objects of the invention is to provide simple means whereby the core is completely removed and the fruit is divided into any desired number of parts. A further object is to provide a device of this character having dividing knives shaped to allow pieces of soft core, or of fruit which may adhere to the unit being operated on, to be thrown free of the coring knife, and to prevent clogging or breaking of the fruit. A further object is to provide a cutting device which may be placed on many forms of paring and coring machines now in general use, without requiring alteration of the arrangement of such machines.

The invention will be hereinafter fully set forth and particularly pointed out in the claims.

In the accompanying drawing:—

Figure 1:
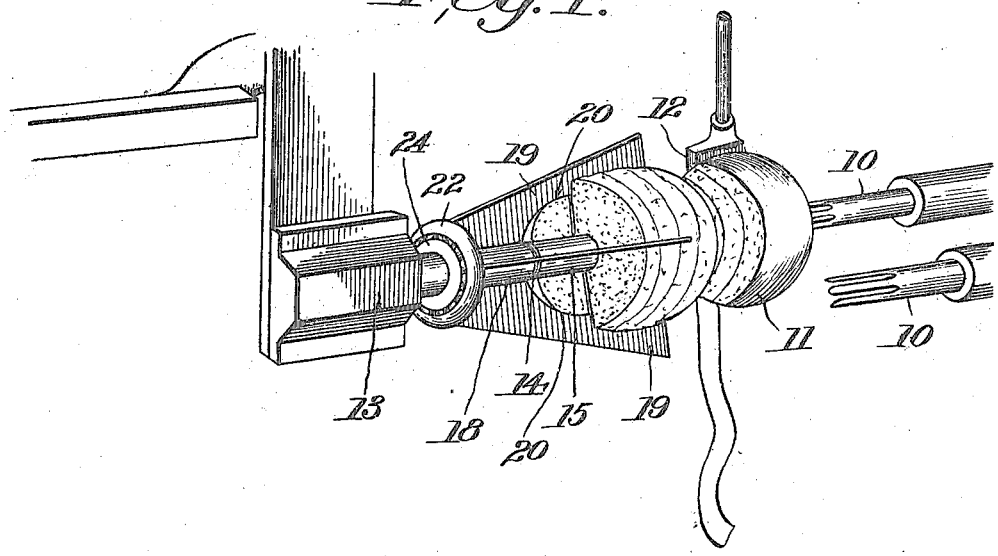
Figure 2:
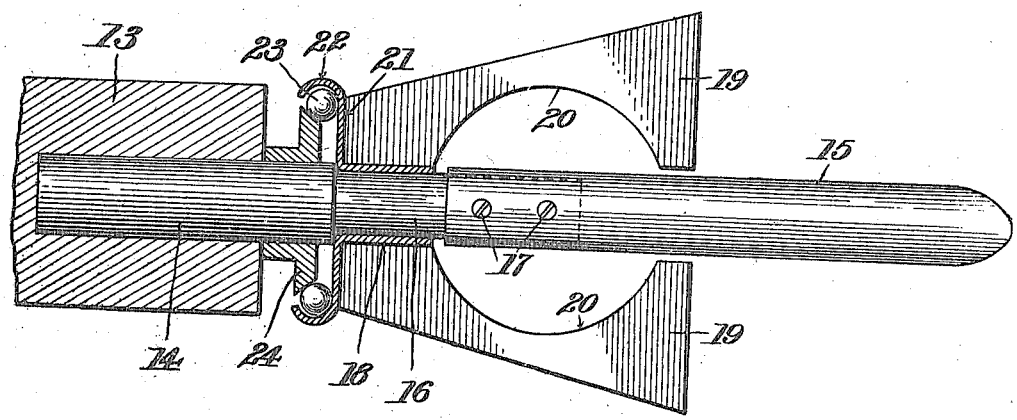

Figure 1 is a perspective view of a portion of a fruit paring and coring machine, with the invention applied thereto. Fig. 2 is a longitudinal sectional view illustrating the coring and dividing device.

Referring to the drawing, 10 designates the fork of an apple paring and coring machine, which may be of any suitable or desired construction, capable of supporting an apple 11, or similar fruit, in position to be acted upon by the paring device 12. These parts may be of any desired construction and are only conventionally shown for purposes of illustration.

The coring knife carrier 13 is provided with a stationary shaft 14, conveniently supported, to one end of which is attached the coring knife 15, said shaft 14 being illustrated as provided with a reduced portion 16 extending into the end of the coring device 15, and attached to the latter by screws 17. Rotatably mounted upon the reduced portion 16 is a sleeve 18, carrying a plurality of radially disposed knives 19, the edge of each knife contiguous to the coring device 15 being cut out on a curved line, as illustrated at 20 to provide a clearance space.

The sleeve 18 is provided with an annular flange 21, shaped to provide a ball race 22, in which are located anti-friction balls 23, which bear against a cone 24, positioned to resist the end thrust of the sleeve 18.

In operation, the fruit is placed upon the fork 10, and it is then peeled by power, in the ordinary and well understood manner, by means of the paring device 12, and at the proper time the coring device 15 is driven through the fruit to core it, the paring mechanism then backing away, all of which operations are well known and common practice. In the present instance, however, as the paring mechanism moves away, the apple or other fruit which has just been operated upon, remains impaled upon the coring device 15. The operator has in the meanwhile placed another apple upon the next following fork 10, and the peeling and coring operation above described is then repeated. The coring device 15 is of such length that there is room for only one average apple on that portion or zone thereof which projects beyond the knives 19. As the second apple is impaled upon the coring device 15, the first apple is forced into the zone defined by the dividing knives 19 by contact with the second apple which is being rotated by the paring mechanism. Therefore the first apple and the sleeve 18, being in frictional contact with the second apple, rotate with the latter, and by the time that the second apple is completely cored, it has taken the place previously occupied on the coring device by the first apple, and the said first apple has been driven completely across the dividing knives, the separated sections flying off by centrifugal force. It is of course, obvious that any desired number of blades 19, may be employed. The complete dividing occurs at a point at which the device can be gaged, to carry the severed sections of the fruit down to a container or carrier, without mixing with the peels, cores, or other refuse. By providing the blades 19 with the curved inner edges 20, ample clearance is provided to allow pieces of soft core, or of apple which may adhere to the first apple, to be thrown free of the coring device 15, and to prevent clogging or breaking of the following fruit.

Having thus explained the nature of the invention, and described an operative manner of constructing and using the same, although without attempting to set forth all of the forms in which it may be made, or all of the forms of its use, the following is claimed:—

1. An improvement in automatic fruit paring and coring machines, comprising a non-rotatable impalement coring device having a coring zone of sufficient length to support an apple during the coring operation and also having a cutting zone in prolongation of the coring zone, and a cutter rotatably mounted on the coring device back of the cutting zone, said cutter having radial blades substantially co-extensive with said cutting zone, rotation of the cutter being effected by rotative power applied to the fruit while on the coring device.

2. An improvement in automatic fruit paring and coring machines, comprising a non-rotatable impalement coring device having a coring zone of sufficient length to support an apple during the coring operation and also having a cutting zone in prolongation of the coring zone, and a cutter rotatably mounted on the coring device back of the cutting zone, said cutter having radial blades substantially coextensive with said cutting zone, said plates having inner concaved edges shaped to provide clearance for material which may adhere to the coring device.

3. An improvement in automatic fruit paring and coring machines comprising a non-rotatable shaft, an impalement coring device rigidly attached to said shaft and having a coring zone of sufficient length to support an apple during the coring operation and also having a cutting zone in prolongation of the coring zone, and a cutter rotatably mounted on the shaft back of the coring zone, said cutter having radial blades substantially coextensive with said cutting zone, rotation of the cutter being effected by rotative power applied to the fruit while on the coring device.

4. An improvement in automatic fruit paring and coring machines comprising a non-rotatable shaft, an impalement coring device rigidly attached to said shaft and having a coring zone of sufficient length to support an apple during the coring operation and also having a cutting zone in prolongation of the coring zone, a sleeve rotatably mounted on said shaft back of the cutting zone, and radially disposed blades carried by said sleeve and overhanging the cutting zone, said blades being substantially coextensive with said cutting zone, rotation of said sleeve and blades being effected by rotative power applied to the fruit while on the coring device.

5. An improvement in automatic fruit paring and coring machines comprising a non-rotatable shaft, an impalement coring device rigidly attached to said shaft and having a coring zone of sufficient length to support an apple during the coring operation and also having a cutting zone in prolongation of the coring zone, a sleeve rotatably mounted on said shaft back of the cutting zone, and radially disposed blades carried by said sleeve and overhanging the cutting zone, said blades being substantially coextensive with said cutting zone, rotation of said sleeve and blades being effected by rotative power applied to the fruit while on the coring device, said blades being provided with concaved inner edges shaped to provide clearance for material which may adhere to the coring device.

6. An improvement in automatic fruit paring and coring machines comprising a non-rotatable shaft, an impalement coring device rigidly attached to said shaft and having a coring zone of sufficient length to support an apple during the coring operation and also having a cutting zone in prolongation of the coring zone, a sleeve rotatably mounted on said shaft back of the cutting zone, radially disposed blades carried by said sleeve and overhanging the cutting zone, said blades being substantially coextensive with said cutting zone, rotation of said sleeve and blades being effected by rotative power applied to the fruit while on the coring device, said blades being provided with concaved inner edges shaped to provide clearance for material which may adhere to the coring device, the inner edges of the overhanging portions of said blades being concaved.

7. An improvement in automatic fruit paring and coring machines comprising a non-rotatable shaft, an impalement coring device rigidily attached to said shaft and having a coring zone of sufficient length to support an apple during the coring operation and also having a cutting zone in prolongation of the coring zone, a cutter rotatably mounted on the shaft back of the coring zone, said cutter having radial blades substantially coextensive with said cutting zone, rotation of the cutter being effected by rotative power applied to the fruit while on the coring device, and means carried by said shaft for resisting the end thrust upon the cutter.

8. An improvement in automatic fruit paring and coring machines comprising a non-rotatable shaft, an impalement coring device rigidly attached to said shaft and having a coring zone of sufficient length to support an apple during the coring operation and also having a cutting zone in prolongation of the coring zone, and a cutter rotatably mounted on the shaft back of the coring zone, said cutter having radial blades substantially coextensive with said cutting zone, rotation of the cutter being effected by rotative power applied to the fruit while on the coring device, a thrust cone carried by the shaft, and a bearing flange carried by the cutter and coöperating with said thrust cone to resist the end thrust on the cutter.

9. An improvement in automatic fruit paring and coring machines comprising a non-rotatable shaft, an impalement coring device rigidly attached to said shaft and having a coring zone of sufficient length to support an apple during the coring operation and also having a cutting zone in prolongation of the coring zone, a cutter rotatably mounted on the shaft back of the coring zone, said cutter having radial blades substantially coextensive with said cutting zone, rotation of the cutter being effected by rotative power applied to the fruit while on the coring device, a thrust cone carried by said shaft, a bearing flange carried by the cutter and having a curved peripheral flange, and antifriction balls interposed between said cone and said flange.

10. An improvement in automatic fruit paring and coring machines, comprising a non-rotatable impalement coring device having a coring zone of sufficient length to support an apple during the coring operation and also having a cutting zone in prolongation of the coring zone, and a cutter rotatably mounted on the coring device back of the cutting zone, said cutter having radial blades substantially coextensive with said cutting zone, and a paring mechanism having means for rotating the fruit units during the paring operation and for maintaining a frictional contact between the fruit unit being pared and a previously pared fruit unit upon said coring device.

In testimony whereof I have hereunto set my hand in presence of two subscribing witnesses.

HARRY A. NELON.

Witnesses:
P. B. PEYTON,
J. E. BRADLEY.

Copies of this patent may be obtained for five cents each, by addressing the "Commissioner of Patents, Washington, D. C."